United States Patent [19]
Uschold et al.

[11] Patent Number: 5,972,472
[45] Date of Patent: Oct. 26, 1999

[54] PROCESS OF FORMING CONTROLLED GLOSS FLUOROPOLYMER FILMS

[75] Inventors: Ronald Earl Uschold, West Chester, Pa.; Thomas Robert Armusewicz, Jr., Grand Island, N.Y.

[73] Assignee: E. I. du Pont de Nemours and Company, Wilmington, Del.

[21] Appl. No.: 08/726,500

[22] Filed: Oct. 7, 1996

[51] Int. Cl.⁶ ............................. B32B 5/16; B32B 31/00; B32B 33/00; B32B 27/08
[52] U.S. Cl. ..................... 428/141; 264/212; 264/219; 264/299; 264/338; 264/331.14; 428/421; 428/480
[58] Field of Search ..................... 428/421, 422, 428/40.2, 40.6, 40.7, 41.3, 41.7, 41.8, 42.2, 480, 483, 141; 264/212, 213, 214, 204, 299, 330, 331, 331.14, 338

[56] References Cited

U.S. PATENT DOCUMENTS

| | | | |
|---|---|---|---|
| 2,510,783 | 6/1950 | Johnston et al. | 260/92.1 |
| 2,599,300 | 6/1952 | Upson | 260/94.9 |
| 2,953,818 | 9/1960 | Bartron | 18/57 |
| 3,139,470 | 6/1964 | Prengle et al. | 264/289 |
| 3,326,739 | 6/1967 | Brennon et al. | 161/168 |
| 3,397,108 | 8/1968 | Hecht et al. | 161/189 |
| 3,549,463 | 12/1970 | Frech | 161/2 |
| 3,556,923 | 1/1971 | Polejes | 161/162 |
| 3,692,621 | 9/1972 | Frech | 161/116 |
| 4,160,798 | 7/1979 | Price et al. | 264/213 |
| 4,366,239 | 12/1982 | Shinagawa et al. | 430/533 |
| 4,376,159 | 3/1983 | Spechler | 430/293 |
| 4,664,859 | 5/1987 | Knoop | 264/102 |
| 4,721,592 | 1/1988 | Fruehauf et al. | 264/171 |
| 4,849,045 | 7/1989 | Schmidt | 156/244.24 |
| 4,877,683 | 10/1989 | Bragaw, Jr. et al. | 428/421 |
| 4,931,324 | 6/1990 | Ellison et al. | 428/31 |
| 5,750,234 | 5/1998 | Johnson et al. | 428/141 |

FOREIGN PATENT DOCUMENTS

| | | |
|---|---|---|
| 3-58-087719 | 5/1983 | Japan . |
| 59-225911A | 12/1984 | Japan . |
| 4-02-008262 | 1/1990 | Japan . |
| 4-02-103269 | 4/1990 | Japan . |
| 3-153770 | 7/1991 | Japan . |
| 4-03-537770 | 7/1991 | Japan . |
| 4-122603A | 4/1992 | Japan . |
| WO97/46377 | 12/1997 | WIPO . |

*Primary Examiner*—Vivian Chen

[57] ABSTRACT

A process is disclosed for manufacturing a controlled gloss fluoropolymer film by casting a fluoropolymer dispersion onto a support substrate which has been coated with a solution containing a substantially inert particulate material, curing, drying and stripping a fluoropolymer film, which has a controlled-gloss or matte finish from the support substrate. The gloss of the matte fluoropolymer film is dependent upon and controlled by the amount of particulate material in the coating solution.

10 Claims, No Drawings

PROCESS OF FORMING CONTROLLED GLOSS FLUOROPOLYMER FILMS

FIELD OF THE INVENTION

The instant invention relates to manufacturing fluoropolymer films having a controlled gloss level.

BACKGROUND OF THE INVENTION

Matte surfaced fluoropolymer films, such as polyvinyl fluoride, have been made by embossing or mechanically roughening the surface of the film as disclosed in U.S. Pat. No. 3,549,463 (Frech), U.S. Pat. Nos. 3,692,621, and 4,721,592 (Fruehauf et al.). Matte finished fluoropolymer films have also been made by casting fluoropolymer dispersions onto a polyester film support containing a deglossing agent as is disclosed in U.S. Pat. No. 4,931,324 (Ellison et al.). A cured, dry, matte fluoropolymer film is stripped from the supporting film. However, conventional methods are limited in that gloss levels are restricted to whatever deglossed polyester film is commercially available. Such conventional methods do not provide for tailoring or controlling gloss levels to meet custom end-use requirements.

Alternatively, matte surfaces may be obtained by adding a so-called deglossing agent to the fluoropolymer dispersion prior to casting onto a support as disclosed in U.S. Pat. No. 3,326,739 (Brennan et al.), U.S. Pat. No. 3,556,923 (Polejes et al.), and U.S. Pat. No. 3,397,108 (Hecht et al.). The presence of the deglossing agent in a fluoropolymer film typically results in hazy transparent films and changes the color of pigmented films. Additionally, the deglossing agent may contribute to discoloration of the fluoropolymer film during lamination or aging.

The disclosure of the previously identified patents and publications is hereby incorporated by reference.

SUMMARY OF THE INVENTION

The present invention relates to a method for manufacturing a controlled gloss fluoropolymer film comprising casting a fluoropolymer dispersion onto a support substrate which has been coated with a solution containing a substantially inert particulate material, coalescing, drying and stripping a fluoropolymer film, which has a controlled-gloss or matte finish from the support substrate. The gloss of the matte fluoropolymer film is dependent upon and controlled by the amount of particulate material in the coating solution.

One advantage of this invention is that surfaces of widely varying gloss can be obtained without adding any deglossing agents to the fluoropolymer film and without investment in expensive embossing equipment or other mechanical deglossing equipment.

In one aspect of the instant invention, a fluoropolymer film having a controlled gloss level is formed by a process comprising the steps of:

(a) preparing a dispersion comprising a fluoropolymer resin;

(b) casting the fluoropolymer dispersion onto a support substrate;

(c) forming a coalesced fluoropolymer film layer upon at least a portion of the support substrate;

(d) drying the fluoropolymer film layer while in contact with support substrate; and, (e) removing the fluoropolymer film layer having a controlled gloss from the support substrate. Typically, the surface of the support substrate which contacts the fluoropolymer film has been treated with a dried coating comprising at least one particulate material and one or more binders.

DETAILED DESCRIPTION

The present invention is applicable to a wide range of weatherable polymer films including acrylate polymers, urethane polymers, vinyl fluoropolymers such as those prepared from trifluoroethylene, hexafluoropropylene, monochlorotrifluoroethylene, dichlorodifluoroethylene, tetrafluoroethylene polymers and copolymers; vinylidene fluoride polymers and copolymers; vinyl fluoride polymers and copolymers, among others. The fluoropolymer may also be a fluorinated ethylene/propylene copolymer, e.g., FEP resins, a copolymer of ethylene/chlorotrifluoroethylene, vinylidene fluoride/hexafluoropropene and vinylidene fluoride/perfluoro (alkyl vinyl ether) dipolymers and terpolymers with tetrafluoroethylene, among others. A more detailed description of polymers can be found in U.S. Pat. Nos. 4,931,324 and 5,536,539; hereby incorporated by reference. While any suitable fluoropolymer film can be employed, the present invention is particularly suited to films comprising polyvinyl fluoride (PVF). The nature and The present invention is particularly suited to cast or unoriented films of polyvinyl fluoride (PVF), the nature and preparation of which are described in detail in U.S. Pat. Nos. 4,877,683; 3,139,470; 2,953,818; 2,419,008; 2,510,783; and 2,599,300, all of which are hereby incorporated by reference.

Fluoropolymer films of this invention may be prepared by any suitable method such as casting a dispersion. For example, by casting a dispersion comprising PVF in propylene carbonate, N-methylpyrrolidone, γ-butyrolactone, sulfolane, dimethyl acetamide, mixtures thereof, among others. The PVF and, optionally one or more dispersants and/or pigments are generally first milled together, e.g., until an average particle size of less than about 1 micron is obtained. A wide variety of mills can be used for the preparation of the dispersion. Typically, the mill used employs a dense agitated grinding medium, such as sand, steel shot, ceramic shot, or pebbles, as in a ball mill, an Attritor, or a Netzsch mill.

The concentration of PVF in the dispersion will vary with particle size of the particular polymer, process equipment, process conditions, among other parameters. The particle size of the PVF is typically about from 0.05 to about 5.0 microns, and normally about from 0.2 to about 1.00 microns. In general, the fluoropolymer will comprise about from about 15 to about 45% by weight of the dispersion.

The fluoropolymer is formed into its desired configuration by casting the dispersion onto a substrate, by using any suitable conventional means, such as spray, roll, knife, curtain, gravure coaters, or any other method that permits applying a substantially uniform film without streaks or other defects. The thickness of the cast dispersion is not critical, so long as the resulting film has sufficient thickness to be self-supporting and be satisfactorily removed from the substrate onto which the dispersion is cast. In general, a thickness of at least about 0.25 mil is satisfactory, and thicknesses of up to about 15 mils can be made by using the dispersion casting techniques of the present invention.

A wide variety of substrates or supports can be used for forming films according to the present invention, depending on the particular polymer and the coalescing conditions. The surface onto which the dispersion is cast should be selected to provide easy removal of the finished film after it is coalesced. While any suitable substrate can be employed for casting the fluoropolymer dispersion, examples of suitable substrates include polymeric films or steel belts. Examples of polymeric films which may be used as a substrate include films comprising polyimides, polyarylates, polyesters, among others. Polyester films, such as oriented polyethylene terephthalate films, have been found to provide desirable performance when producing fluoropolymer films with matte surface characteristics.

A key aspect of the present invention relates to forming fluoropolymer films of controlled gloss. Particularly, fluoropolymer films with varying gloss levels, which are suitable for differing applications, may be achieved by casting a dispersion comprising fluoropolymer resin within a latent solvent onto a support substrate that has been coated with a solution comprising an inert, particulate material and binder. The degree of gloss or surface luster of the resulting fluoropolymer film is dependent upon the amount of particulate contained in the dried coating on the support substrate. As the quantity of particulate material contained in the coating on the support substrate increases, the fluoropolymer film stripped from the substrate has lower specular gloss, i.e., a matte finish. By "gloss" it is meant the amount of specular reflection at a given light incident angle to a surface. Gloss measurement is a system of specifying numerically the perceived gloss of an object. For the purposes of this invention, by matte finish it is meant a film with a specular gloss of less than about 65.

While any suitable particulate materials can be included in the coating solution, examples of suitable particles are relatively inert and have a particle size of between about 1 and about 100 microns. By "inert" it is meant that the particulate materials are unreactive or unaffected by other materials singly or in combination that are used to prepare the support substrate or the fluoropolymer film. Examples of such materials include inorganic materials, such as silica, calcium carbonate, clay, talc, carbon fibers or particles, glass fibers or particles, barium sulfate, glass micro beads; and organic materials, such as polymeric fibers or particles of nylon or polyester, mixtures thereof, among others. The amount of particulate materials in the dried substrate coating will typically range from about 1 to about 30 wt %. Typically, the thickness of the coating will range from about 0.1 mils to about 0.5 mils.

While any suitable binder can be included in the coating solution, examples of suitable binders comprise polymeric materials that bond relatively well to both the support substrate and the particulate material; but normally, are not soluble in the fluoropolymer dispersion to be cast on the coated support substrate. Polyvinyl alcohol is particularly suitable as a binder because polyvinyl alcohol may be coated on to the substrate from an aqueous solution which is substantially nonflammable and nontoxic. Typically, the polyvinyl alcohol concentration in the coating solution will be about 2 to about 15% by weight depending on the molecular weight of the polyvinyl alcohol and the amount of particulate material. The relative concentration of solution components may be adjusted as desired to obtain the desired coating viscosity. In addition to polyvinyl alcohol, polyvinyl alcohol resins with up to about 15% acetate groups may be used as a suitable binder. After being applied to a substrate, the coating is dried in air at a temperature below about 100° C. so as to avoid bubble formation, and subsequently fixed on the substrate by heating in air at a temperature from about 90° C. to about 150° C. for a relatively short period of time, e.g., about 2 minutes.

The fluoropolymer dispersion is cast onto the coated support substrate, and then heated to coalesce the fluoropolymer into a film. The conditions used to coalesce the polymer will vary with the polymer used, the thickness of the cast dispersion, among other operating conditions. Typically, when employing a PVF dispersion, oven temperatures of from about 340° to about 480° F. can be used to coalesce the film, and temperatures of about 380° to about 450° F. have been found to be particularly satisfactory. The oven temperatures, of course, are not representative of the temperatures of the polymer being treated, which will be lower. After coalescence, the finished film is stripped from the substrate by using any suitable conventional technique. The surface of the finished film, which contacted the substrate, will have a matte finish.

The fluoropolymer films of the present invention, and in particular polyvinyl fluoride, are noted for attractiveness and possesses an unusual combination of excellent resistance to outdoor weathering exposures, a high degree of physical toughness, chemical inertness, abrasion resistance, resistance to soiling and the action of solvents as well as an significant retention of these properties at both low and elevated temperatures, among other desirable properties. The foregoing list of properties not only suggests many areas of use for PVF in the form of self supporting films, but also the use of such films as the outer layer of a wide variety of laminar structures wherein PVF films serve to upgrade less functional base layers. For example, matte finish PVF films can be used in architectural applications requiring decorative, functional structures which exhibit a minimum or reflective glare, e.g., pigmented PVF films exhibiting a low specular gloss. Pigmented PVF films however, tend normally to exhibit a rather high specular gloss, e.g., a Gardner gloss rating from about 50 to about 75 at 60°. Fluoropolymer films of this invention exhibit relatively low gloss levels (or matte finish) that can be controlled and varied according to market demands. That is, the fluoropolymer films of the invention typically possess a matte finish characterized by a gloss of about 5 to about 65 at 60°.

While the above description emphasized using PVF films for architectural applications, the instant invention can be employed with a wide range of fluoropolymers and end-uses. For example, the low gloss or matte finish films of the instant invention can be employed on signs, awnings, wall coverings, window and door lineals, roof members, truck trailer panels, aircraft interior panels, auto parts, bus and train wall panels, decals, molded furniture parts, seat backs, laminated fabric, among other uses. Further, the films of the invention can be removed from the coated substrate and/or laminated to one or more additional substrates. Further still, the films of the invention can be shaped by using any suitable process into a virtually unlimited array of configurations.

Certain aspects of the present invention are shown by the following Example which is provided to illustrate and not limit the scope of the invention as defined in the appended claims.

EXAMPLE

Substrates used for forming matte films of polyvinyl fluoride with varying controlled gloss levels were prepared according to the following procedure.

A 10% by weight solution was prepared from polyvinyl alcohol (obtained from Aldrich Chemical Co. that was 98% hydrolyzed) by stirring in water warmed to 90° C. When dissolution was complete the solution was cooled to room temperature. Silica, purchased as Syloid® 308 silica from W. R. Grace Co., was added to portions of the solution in the amounts to give concentrations listed in the following Table. The silica was mixed thoroughly into the solutions by vigorous stirring in an agitated flask. The solutions were then coated onto glossy polyester film supplied by the DuPont Co. and known as Mylar® 200D polyester film by drawing down a portion of each solution listed in the Table onto a sample of polyester with a wire wound rod. As the amount of silica in the polyvinyl alcohol solution increased, the viscosity also increased and coating may become difficult with highly viscous materials. The coating viscosity may be reduced as desired by diluting the coating with water.

The coated polyester films were then allowed to air dry and the coating was fixed onto the polyester by baking for 2 minutes at 90° C. The dry polyvinyl alcohol coating was about 0.2 mil thick. The baking prevented the coating from peeling away from the polyester when the polyvinyl fluoride film was stripped.

A dispersion containing 40% by weight of polyvinyl fluoride in propylene carbonate, manufactured by the DuPont Co. and known as 44-1000, was applied to the coated polyester by means of a doctor knife. The polyvinyl fluoride was coalesced into a continuous film and dried in a circulating air oven maintained at 200° C. for three minutes. After cooling to room temperature, the resulting polyvinyl fluoride film was cleanly peeled from the coated polyester to yield an attractive matte finish film 1 mil thick. Film thicknesses of about 0.2 to about 3 mils can be produced by using this method.

Gloss (specular reflectance) level was measured by means of a Statistical Novogloss instrument available from Paul N. Gardner Co., Pompano Beach, Fla. operated according to the instructions provided with the instrument.

The above procedure was followed for each sample listed below and produced films with gloss proportional to the amount of silica in the polyvinyl alcohol coating. For example, data in the Table below show that a polyvinyl alcohol coating with no silica, as in sample A produces a film with 60° gloss of 101 while a coating containing 25% silica, in samples E, F and G, produces as a film with 60° gloss of about 11. Also the amount of polyvinyl alcohol in the coating solution may be varied to conveniently adjust viscosity without substantially changing the gloss of the polyvinyl fluoride film produced. For example, the polyester web used for sample E was coated with a solution containing 5 weight % polyvinyl alcohol and produced a film with 60° gloss of 11.7, while the polyester web used for sample G was coated with a solution containing 10 weight % polyvinyl alcohol and produced a film with 60° gloss of 10.5.

TABLE

| Sample | Wt % PVA (in substrate coating solution) | Wt % Silica (based on PVA) | Gloss at 60° PVF |
|---|---|---|---|
| A | 10 | 0.0 | 101 ± 2 |
| B | 10 | 4.0 | 32 ± 5 |
| C | 10 | 8.0 | 28 ± 5 |
| D | 10 | 23.0 | 12.4 ± 0.2 |
| E | 5 | 25.0 | 11.7 ± 0.7 |
| F | 7.5 | 25.0 | 10.8 ± 0.6 |
| G | 10 | 25.0 | 10.5 ± 0.3 |

The following is claimed:

1. A process for forming a fluoropolymer film of controlled gloss the process comprising the steps of:

(a) preparing a dispersion comprising at least one fluoropolymer resin;

(b) casting the fluoropolymer dispersion onto a support substrate;

(c) forming a substantially coalesced fluoropolymer film layer upon at least a portion of at least one surface of the support substrate;

(d) drying the fluoropolymer film layer while in contact with support substrate; and (e) removing the fluoropolymer film layer from the support substrate; wherein the surface of the support substrate which contacts the fluoropolymer dispersion is affixed with a dried coating comprising at least one particulate material and binder, said particulate material having a particle size of between about 1 and about 100 microns, the gloss of the fluoropolymer film being controlled by the amount of particulate material contained in said dried coating.

2. The process of claim 1 wherein the fluoropolymer resin comprises polyvinyl fluoride.

3. The process of claim 1 wherein the gloss of the dried fluoropolymer film is in the range from about 5 to about 65.

4. The process of claim 1 wherein the substrate comprises a polyester film.

5. The process of claim 4 wherein the particulate comprises silica.

6. The process of claim 1 wherein the particulate comprises an inorganic material.

7. The process of claim 1 wherein the particulate comprises an organic material.

8. The process of claim 1 wherein the binder comprises polyvinyl alcohol.

9. A fluoropolymer film formed by the process of claim 1.

10. A process for forming a fluoropolymer film of controlled gloss the process comprising the steps of:

(a) preparing an aqueous solution of at least one particulate material and at least one binder, said particulate material having a particle size of between about 1 and about 100 microns;

(b) coating a support substrate with the aqueous solution and drying the substrate to form a coated support substrate;

(c) preparing a dispersion comprising at least one fluoropolymer resin;

(d) casting the fluoropolymer dispersion onto a coated support substrate;

(e) forming a substantially coalesced fluoropolymer film layer upon at least a portion of at least one surface of the support substrate;

(f) drying the fluoropolymer film layer while in contact with the support substrate; and (g) removing the fluoropolymer film layer from the support substrate;

wherein the surface of the fluoropolymer film has a specular gloss imparted by the coated support substrate, the gloss of the fluoropolymer film being controlled by the amount of particulate material contained in said coating on said coated support substrate.

* * * * *